(12) United States Patent
Shirato et al.

(10) Patent No.: US 7,551,996 B2
(45) Date of Patent: Jun. 23, 2009

(54) VEHICLE MOTION CONTROL DEVICE

(75) Inventors: Ryota Shirato, Yokohama (JP); Hiroshi Mouri, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 527 days.

(21) Appl. No.: 11/178,406

(22) Filed: Jul. 12, 2005

(65) Prior Publication Data

US 2006/0041356 A1 Feb. 23, 2006

(30) Foreign Application Priority Data

Aug. 19, 2004 (JP) ............................. 2004-239686

(51) Int. Cl.
*B60G 23/00* (2006.01)
*B60T 8/24* (2006.01)

(52) U.S. Cl. .......................... 701/40; 701/72; 303/140
(58) Field of Classification Search .................. 701/40, 701/71; 303/140
See application file for complete search history.

(56) References Cited

U.S. PATENT DOCUMENTS

| | | | |
|---|---|---|---|
| 6,265,991 B1 * | 7/2001 | Nishiwaki et al. ........... | 340/903 |
| 6,489,887 B2 * | 12/2002 | Satoh et al. .................. | 340/436 |
| 6,850,628 B2 * | 2/2005 | Shirato ........................ | 382/104 |
| 2002/0042668 A1 * | 4/2002 | Shirato et al. ................ | 701/1 |
| 2002/0095246 A1 * | 7/2002 | Kawazoe ....................... | 701/1 |
| 2002/0128760 A1 * | 9/2002 | Bodie et al. ................... | 701/37 |
| 2002/0131620 A1 * | 9/2002 | Shirato ........................ | 382/104 |

FOREIGN PATENT DOCUMENTS

| | | |
|---|---|---|
| JP | H05-197423 A | 8/1993 |
| JP | 2970408 B | 9/1995 |
| JP | 3209671 B | 6/1997 |
| JP | 11-102499 A | 4/1999 |
| JP | 2002-120711 A | 4/2002 |
| JP | 2003-327151 A | 11/2003 |

* cited by examiner

*Primary Examiner*—Mark Hellner
*Assistant Examiner*—Helal A Algahaim
(74) *Attorney, Agent, or Firm*—Global IP Counselors, LLP (57) ABSTRACT

A vehicle motion control device is configured to determine whether the lane in which the vehicle is traveling is straight or curved. If the road is curved, a target yaw rate is set such that the yaw rate of the vehicle to the target position is averaged. If the road is straight, the target yaw rate is set such that the response delay does not exceed a target value. Therefore, wavering of the vehicle with respect to the lane is suppressed, and the vehicle is controlled to move smoothly when the road is curved and briskly when the road is straight. When the road switches between a curved road and a straight road, the target yaw rate is gradually changed between a target yaw rate calculated for a curved road and a target yaw rate calculated for a straight road.

18 Claims, 5 Drawing Sheets

VEHICLE MOTION CONTROL DEVICE

CROSS-REFERENCE TO RELATED APPLICATIONS

This application claims priority to Japanese Patent Application No. 2004-239686. The entire disclosure of Japanese Patent Application No. 2004-239686 is hereby incorporated herein by reference.

BACKGROUND OF THE INVENTION

1. Field of the Invention

The present invention relates to a vehicle motion control device configured to control the motion of a vehicle in which the vehicle motion control device is installed. More particularly, the present invention is related to a vehicle motion control device configured to calculate a target yaw rate required for the vehicle to arrive at a target position set in front of the vehicle, and to control the motion of the vehicle based on dynamic changes of the vehicle to generate the calculated target yaw rate.

2. Background Information

One example of this kind of vehicle motion control device is disclosed in Japanese Laid-Open Patent Publication No. 2003-327151. The vehicle motion control device presented in the above publication is configured to prevent a vehicle from deviating from the lane in which the vehicle is traveling by controlling the motion of the vehicle to eliminate the angular difference between the movement direction of the vehicle and the direction of the lane in which the vehicle is traveling. The vehicle motion control device in the above publication is configured to detect the angle that will exist between the lane in which the vehicle is traveling and the direction in which the vehicle is traveling after a prescribed amount of time elapses or after the vehicle travels for a prescribed distance and to calculate the direction in which the vehicle should proceed in order to make that angle to be zero. The vehicle motion control device is then configured to control the motion of the vehicle such that vehicle travels in the calculated direction. The direction in which the vehicle should proceed is calculated as a target yaw rate and the target yaw rate is calculated and set such that the yaw rate to a target position set in front of the vehicle is averaged.

In view of the above, it will be apparent to those skilled in the art from this disclosure that there exists a need for an improved vehicle motion control device. This invention addresses this need in the art as well as other needs, which will become apparent to those skilled in the art from this disclosure.

SUMMARY OF THE INVENTION

Since the vehicle motion control device disclosed in the aforementioned publication is configured to set the target yaw rate required to arrive at the target position such that the yaw rate to the target position set in front of the vehicle is merely averaged, there are some situations in which the vehicle motion can be adapted to the road conditions and other situations in which the vehicle motion cannot be adapted to the road conditions. For example, the vehicle motion control device can adapt the vehicle motion to the road when the road on which the vehicle is traveling is a curved road. However, the vehicle motion control device cannot adapt the vehicle motion to the road when the road on which the vehicle is traveling is a straight road.

The present invention was developed in order to resolve this problem. One object of the present invention is to provide a vehicle motion control device that can adapt the vehicle motion while traveling toward the target position to the road conditions in all situations.

In order to achieve the above object and other objects of the present invention, a vehicle motion control device is provided that comprises a road condition detecting section, a target yaw rate calculating section and a vehicle motion control section. The road condition detecting section is configured to detect a road condition of a road on which a vehicle is traveling. The target yaw rate calculating section is configured to calculate a target yaw rate required for the vehicle to arrive at a target position that is set in front of the vehicle by selectively switching between first and second calculating methods for calculating the target yaw rate in accordance with the road condition detected by the road condition detecting section. The vehicle motion control section is configured to control a vehicle motion based on change in at least one dynamic parameter indicative of a vehicle traveling condition to generate the target yaw rate calculated in the target yaw rate calculating section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 6(a) is a plot illustrating an alternative manner in which the target yaw rate is gradually changed from a target yaw rate calculated for a straight road to a target yaw rate calculated for a curved road in accordance with a road curvature parameter in the vehicle motion control device in accordance with the preferred embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1A:
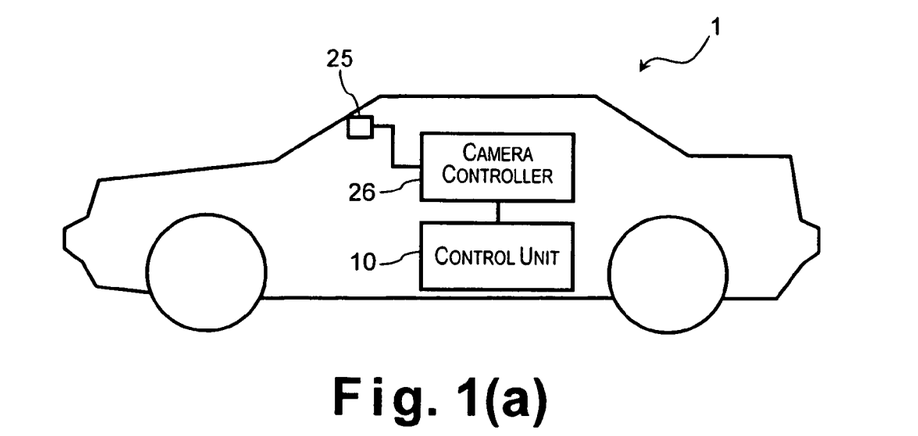
FIG. 1(a) is an schematic side view of a vehicle in which a vehicle motion control device in accordance with a preferred embodiment of the present invention is operatively coupled to a lane tracking cruise control device.
Figure 1B:
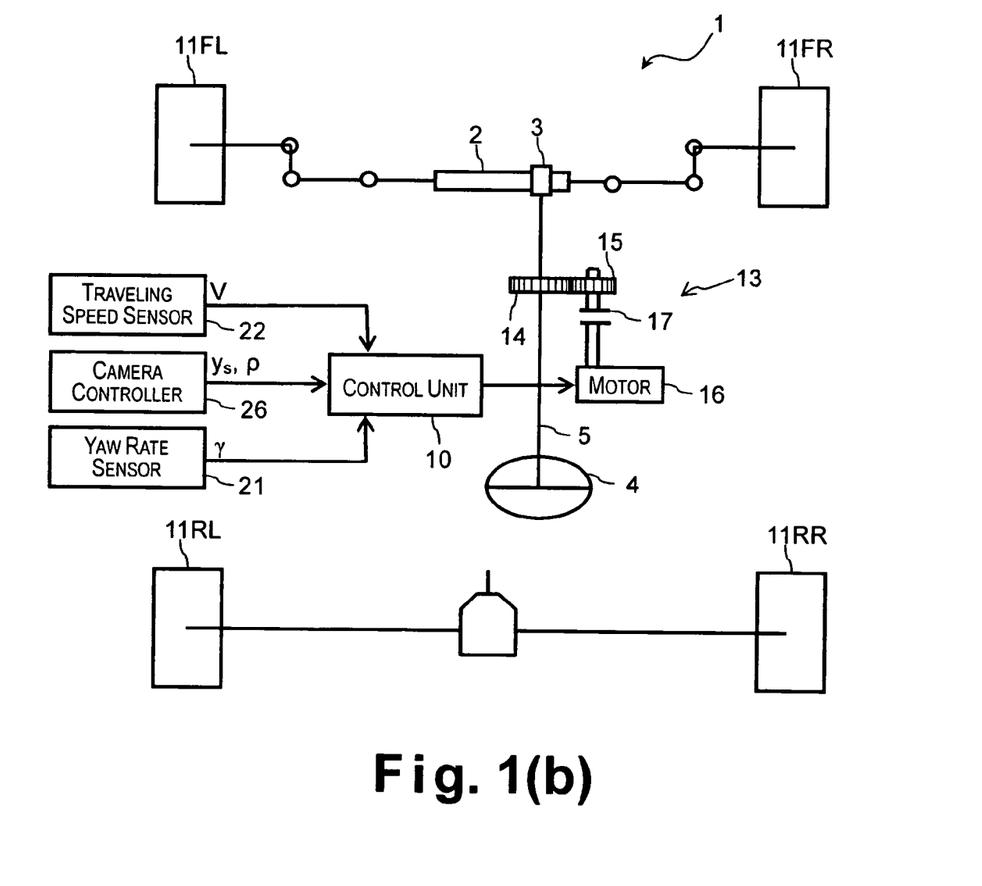
FIG. 1(b) is a schematic diagram of the vehicle illustrated in FIG. 1(a) showing constituent components of the vehicle motion control device in accordance with the preferred embodiment of the present invention.

Referring initially to FIGS. 1(a) and 1(b), a vehicle motion control device is illustrated in accordance with a preferred embodiment of the present invention. FIGS. 1(a) and 1(b) are schematic views of a vehicle 1 in which the vehicle motion control device in accordance with the preferred embodiment is applied to a lane tracking cruise control device. As seen in FIG. 1(b), the vehicle 1 includes a pair of front wheels 11FL and 11FR and a pair of rear wheels 11RL and 11RR. The front wheels 11FL and 11FR are preferably installed on a conventional rack and pinion type steering mechanism. Such conventional steering mechanism comprises a rack 2 connected to the steering rods (tie rods) of the front wheels 11FL and 11FR, a pinion 3 configured and arranged to mesh with the rack 2, and a steering shaft 5 configured and arranged to rotate the pinion 3 using the steering torque applied to a steering wheel 4. The steering mechanism including the rack 2, the pinion 3, the steering wheel 4 and the steering shaft 5 is a conventional mechanism that is well known in the art. Since the steering mechanism is well known in the art, these structures will not be discussed or illustrated in detail herein. Rather, it will be apparent to those skilled in the art from this disclosure that the components can be any type of structure that can be used to carry out the present invention.

The vehicle 1 is also provided with an automatic steering mechanism 13 that is arranged on the steering shaft 5 above the pinion 3. The automatic steering mechanism 13 constitutes a steering actuator that is configured and arranged to automatically steer the front wheels 11FL and 11FR. The automatic steering mechanism 13 basically comprises a driven gear 14 mounted coaxially with respect to the steering shaft 5, a drive gear 15 that meshes with the driven gear 14, and an automatic steering motor 16 configured and arranged to rotationally drive the drive gear 15. A clutch mechanism 17 is installed between the automatic steering motor 16 and the drive gear 15. The clutch mechanism 17 is connected during automatic steering control and disconnected at all other times so that the torque or rotation of the automatic steering motor 16 is not inputted to the steering shaft 5.

The vehicle 1 is also provided with a variety of sensors including, but not limited to, a yaw rate sensor 21 and a traveling speed sensor 22 as seen in FIG. 1(b). The yaw rate sensor 21 is configured and arranged to detect a yaw rate γ of the vehicle 1 and send the detected value to a control unit 10. The traveling speed sensor 22 is preferably provided on the output side of an automatic transmission (not shown) of the vehicle 1, and configured and arranged to detect a traveling speed V of the vehicle 1. The traveling speed V detected by the traveling speed sensor 22 is also sent to the control unit 10.

Moreover, as seen in FIG. 1(a), a CCD camera or other monocular camera 25 is mounted to the rearview mirror stay or other fastening part inside the vehicle cabin of the vehicle 1. The monocular camera 25 is configured and arranged to photograph the situation in front of the vehicle 1 and send the resulting image data to a camera controller 26. In a manner similar to that described in, for example, Japanese Laid-Open Patent Publication No. 11-102499, the camera controller 26 is configured to apply binary processing or other processing to the image data obtained with the monocular camera 25 to detect the white lines on both sides of the vehicle 1 and thereby detect the lane in which the vehicle 1 should be traveling. The camera controller 26 is configured to calculate or detect a current lateral displacement $y_c$ of the vehicle 1 with respect to the lane in which the vehicle 1 is traveling, a relative lateral displacement $y_s$ between the current position of the vehicle 1 and a target position (i.e., a prescribed observation point) of the vehicle 1 located within the lane in front of the vehicle 1, and a curvature ρ of the lane in front of the vehicle 1. The camera controller 26 is configured to send these calculated or detected values to the control unit 10 as conditions of the lane (road) (i.e., the road conditions). The lateral displacement $y_c$ of the vehicle 1 with respect to the lane is defined, for example, as the amount by which the position of the vehicle 1 is offset laterally from the center of the lane.

The control unit 10 preferably comprises a microcomputer or other discrete digital system. More specifically, the control unit 10 preferably includes a microcomputer with a vehicle motion control program that controls the vehicle motion as discussed below. The control unit 10 can also include other conventional components such as an input interface circuit, an output interface circuit, and storage devices such as a ROM (Read Only Memory) device and a RAM (Random Access Memory) device. The microcomputer of the control unit 10 is programmed to control the automatic steering mechanism 13 to automatically steer the front wheels 11FL and 11FR. The memory circuit stores processing results and control programs such as ones for yaw rate calculating operation that are run by the processor circuit. The control unit 10 is operatively coupled to the various components of the vehicle 1 in a conventional manner. The internal RAM of the control unit 10 stores statuses of operational flags and various control data. The internal ROM of the control unit 10 stores various data and maps for various operations. The control unit 10 is capable of selectively controlling any of the components of the control system in accordance with the control program. It will be apparent to those skilled in the art from this disclosure that the precise structure and algorithms for the control unit 10 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The control unit 10 is configured to calculate a target yaw rate $\gamma^*$ required to follow the lane on which the vehicle 1 is traveling based on the actual yaw rate $\gamma$, the traveling speed V, the vehicle lateral displacement $y_c$, the relative lateral displacement $y_s$, and the lane curvature $\rho$ received as input. Then, the control unit 10 is configured to determine a steering angle command value for achieving the calculated target yaw rate $\gamma^*$. The control unit 10 is then configured to calculate a command current value i for reaching the steering angle command value and deliver the command current value i to the automatic steering motor 16 through a current servo system. Thus, the control unit 10 is configured to execute lane tracking cruise control.

Figure 2:
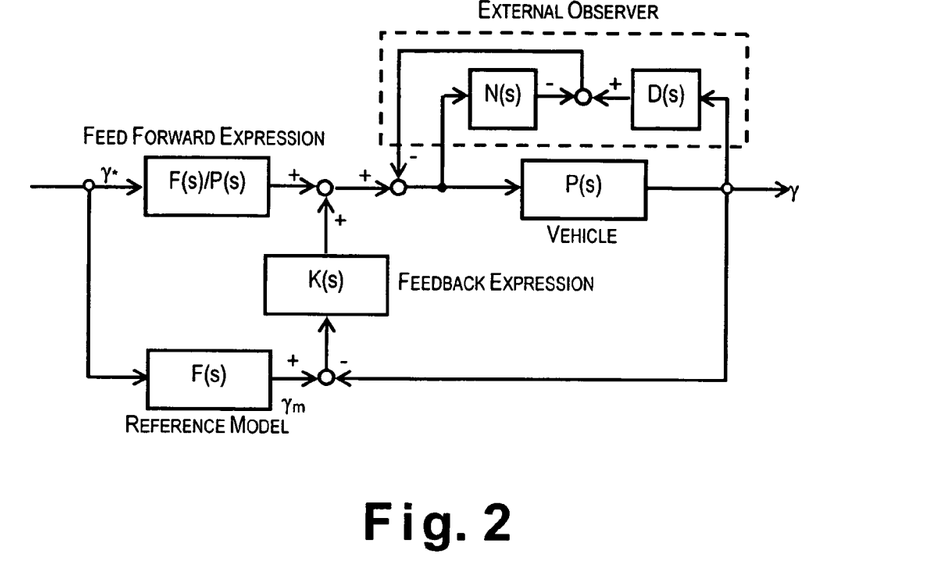
FIG. 2 is a block diagram illustrating a control logic used in the vehicle motion control device to control a vehicle motion based on dynamic changes in the vehicle traveling condition to achieve a target yaw rate in accordance with the preferred embodiment of the present invention.

FIG. 2 is a block diagram illustrating the control logic used in the vehicle motion control device of the preferred embodiment when calculating the target yaw rate $\gamma^*$. This control logic is configured to use model matching in order to take into account changes in dynamic parameters indicative of vehicle traveling conditions such as the change in the traveling speed V of the vehicle 1 with respect to time and the change in the curvature $\rho$ of the lane in which the vehicle 1 is traveling with respect to time.

In FIG. 2, assuming P(s) is the output characteristic of the yaw rate $\gamma$ with respect to a steering angle input and F(s) is the output characteristic of a model yaw rate $\gamma m$ with respect to the target yaw rate $\gamma^*$ for a reference model of the vehicle 1, a feed forward expression of the steering angle command value with respect to the target yaw rate $\gamma^*$ is obtained by dividing the model output characteristic F(s) by the output characteristic P(s) (i.e., F(s)/P(s)). On the other hand, a feedback expression of the steering angle command value is calculated by applying a function K(s) to the value obtained by subtracting the actual yaw rate $\gamma$ from the model yaw rate $\gamma m$ of the vehicle reference model. The steering angle command value that will actually be issued to the vehicle 1 is then calculated as the sum of the feed forward expression for the steering angle command value and the feedback expression for the steering angle command value minus a disturbance rejection component calculated by a disturbance observer (i.e., external observer) as seen in FIG. 2.

Referring now to the flowchart of FIG. 3, the computer processing sequence used to calculate and deliver the command current value i to the automatic steering motor 16 during the lane tracking cruise control executed in the preferred embodiment will be described. The processing sequence described in FIG. 3 is preferably executed by the microcomputer or other computing device inside the control unit 10 once per prescribed sampling time period $\Delta T$ (set to, for example, 10 ms) and is only executed when a request for lane tracking cruise control has been issued by the driver of the vehicle 1.

Figure 3:
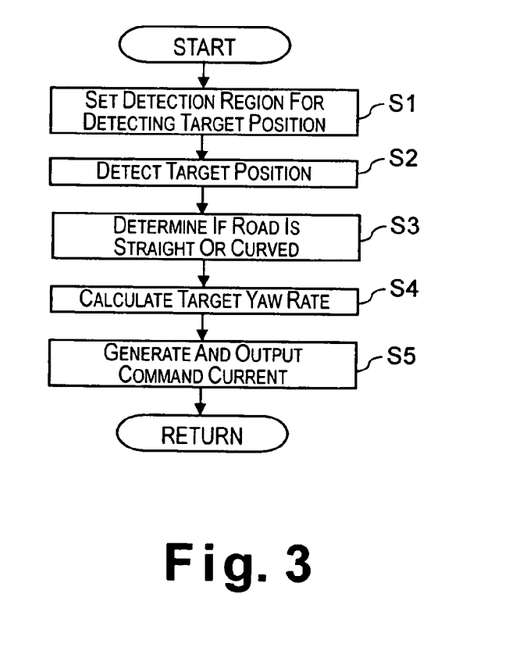
FIG. 3 is a flowchart showing the processing sequence for vehicle motion control executed by a control unit of the vehicle motion control device shown in FIGS. 1(a) and 1(b) in accordance with the preferred embodiment of the present invention.
Figure 4:
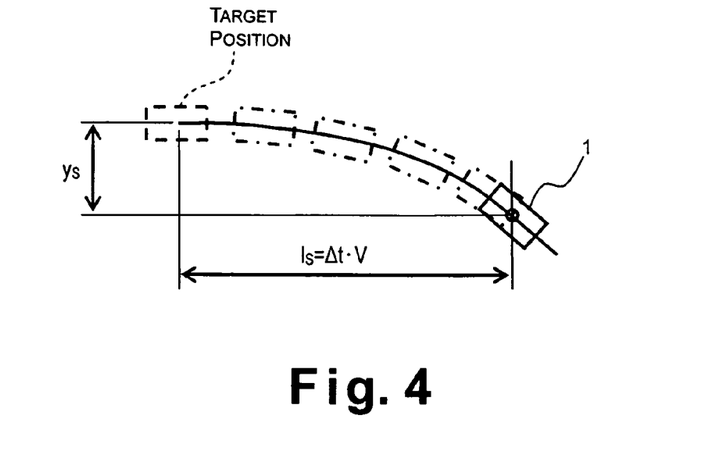
FIG. 4 is a schematic diagram illustrating the forward distance and the relative lateral displacement between the current position and the target position of the vehicle.

In step S1 of the processing sequence shown in FIG. 3, the control unit 10 is configured to set a detection region required to detect the target position in front of the vehicle 1 toward which the vehicle 1 is to proceed. For example, as shown in FIG. 4, the control unit 10 is configured to set a point where the vehicle 1 should arrive after a preset period of time $\Delta t$ as the target position (shown with the dotted line in FIG. 4) and set a portion of the image data read into the camera controller 26 located in the vicinity of the target position as the detection region for detecting information regarding the target position.

In step S2, the control unit 10 is configured to detect the target position where the vehicle 1 is to arrive within the detection region set in step S1. More specifically, as shown in FIG. 4, for example, the control unit 10 is configured to find the forward distance $l_s$ to the target position where the vehicle 1 will be at after the prescribed time period $\Delta t$ has elapsed and the relative lateral displacement $y_s$ between the target position (shown with the dotted line in FIG. 4) and the current position of the vehicle 1 (shown in the solid line in FIG. 4). The forward distance $l_s$ is obtained, for example, by multiplying the vehicle speed V by the prescribed time period $\Delta t$. As will be described later, detecting the relative lateral displacement $y_s$ between the current position and the target position of the vehicle 1 is equivalent to detecting the conditions of the lane (road) (i.e., the road condition) in which the vehicle 1 is traveling because the relative lateral displacement $y_s$ changes depending on the conditions of the lane (road) (e.g., whether the road is a straight road or a curved road).

In step S3, the control unit 10 is configured to determine if the lane (road) in which the vehicle 1 is traveling is a straight road or a curved road. More specifically, the control unit 10 is configured to determine that the road is curved if the relative lateral displacement $y_s$ with respect to the forward distance $l_s$ found as the lane (road) condition in step S2 is equal to or larger than a prescribed displacement value and otherwise determine that the road is straight. It is also acceptable for the control unit 10 to determine that the road is straight if the relative lateral displacement $y_s$ with respect to the forward distance $l_s$ is equal to or smaller than a prescribed displacement value and otherwise determine that the road is curved. In additional to or independently of the determination based on the relative lateral displacement $y_s$, it is also acceptable for the control unit 10 to determine that the road is curved when the curvature $\rho$ of the lane (road) in front of the vehicle 1 detected as a lane (road) condition is equal to or larger than a prescribed value and otherwise determine that the road is straight, or to determine that the road is straight when the curvature $\rho$ of the lane (road) in front of the vehicle 1 is equal to or smaller than a prescribed value and otherwise determine that the road is curved. Also, as will be described later, since in this embodiment the method of calculating the target yaw rate $\gamma^*$ is switched in accordance with the detected road conditions, i.e., depending on whether the road is curved or straight, the control unit 10 can, in addition to or independently of the determinations just described, be configured to determine that the road has changed from a straight road to a curved road when the difference between the lateral displacement $y_c$ of the vehicle 1 within the road and a target value of the lateral displacement (target lateral displacement) within the lane (road) based on the calculated target yaw rate $\gamma^*$ equals or exceeds a prescribed value. Conversely, the control unit 10 can be configured to determine that the road has changed from a curved road to a straight road when the difference between the lateral displacement $y_c$ of the vehicle 1 within the road and a target value of the lateral displacement (target lateral displacement) within the lane (road) based on the calculated target yaw rate $\gamma^*$ is equal to or below a prescribed value. In addition to or independently of these determinations, it is also possible for the control unit 10 to determine if the lane is straight or curved based on map information obtained from a navigation system or the like. Thus, the terms "straight road" and "substantially straight" for a road as used herein do not mean a perfectly straight road, but rather a road that follows a substantially straight path within a certain prescribed range of deviation.

In step S4, the control unit 10 is configured to calculate the target yaw rate $\gamma^*$. In the vehicle motion control device of the present invention, the control unit 10 is configured to selectively change a calculating method for calculating the target yaw rate $\gamma^*$ depending on whether the lane is determined to be straight or curved in step S3. In other words, with the vehicle motion control device in accordance with the present invention, the method of calculating the target yaw rate $\gamma^*$ required to arrive at the target position in front of the vehicle 1 is switched in accordance with the road conditions detected in step S3. As a result, the vehicle motion required to arrive at the target position can be adapted to the conditions of the road at all times. For example, when the road is detected to be curved in step S3, the target yaw rate $\gamma^*$ is calculated so that the vehicle 1 is controlled to move smoothly to the target position. When the road is detected to be straight in step S3, the target yaw rate $\gamma^*$ is calculated so that the vehicle 1 is controlled to move more briskly to the target position. This switching of the calculating methods for the target yaw rate $\gamma^*$ will be described in more detail below.

In step S5, the control unit 10 is configured to calculate the command current value i required to achieve the target yaw rate $\gamma^*$ by following the control logic indicated in FIG. 2, and return to the main program after the command current value i has been generated and outputted to the automatic steering motor 16.

Figure 5A:
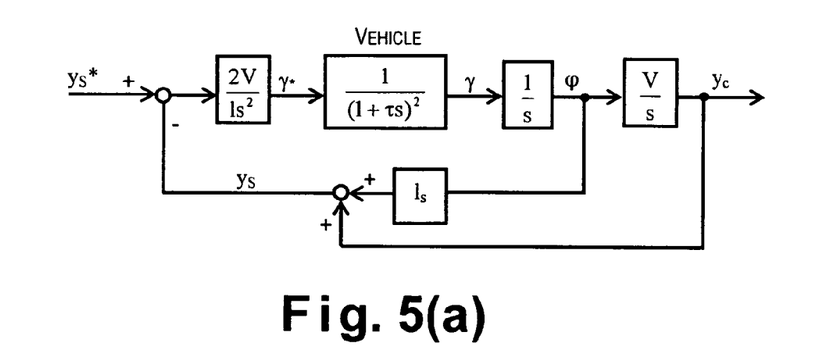
FIG. 5(a) is a block diagram illustrating a control logic used in the vehicle motion control device to calculate the target yaw rate for a curved road in accordance with the preferred embodiment of the present invention.
Figure 5B:
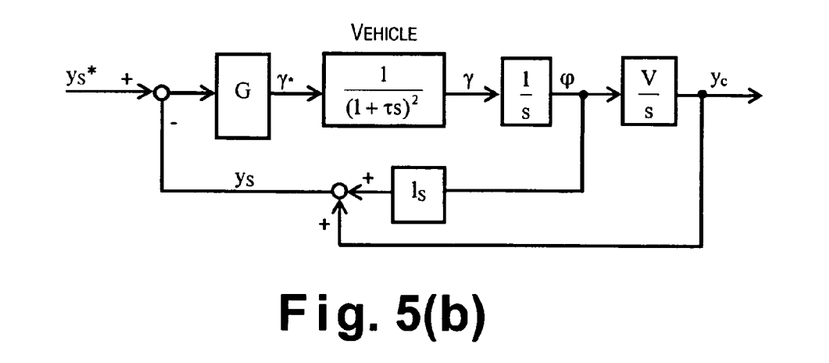
FIG. 5(b) is a block diagram illustrating a control logic used in the vehicle motion control device to calculate the target yaw rate for a straight road in accordance with the preferred embodiment of the present invention.

Referring now to FIGS. 5(a) and 5(b), the method of calculating the target yaw rate $\gamma^*$ in step S4 of the processing sequence shown in FIG. 3 will be explained. In this preferred embodiment, the control unit 10 is configured to determine the lane (road) conditions, i.e., if road is straight or curved, in step S3 of FIG. 3 and then calculate the target yaw rate $\gamma^*$ by following the control logic shown in FIG. 5(a) if the lane is curved or by following the control logic shown in FIG. 5(b) if the lane is straight. In this way, the method of calculating the target yaw rate $\gamma^*$ is switched in accordance with the conditions of the lane (road).

In either control logic shown in FIG. 5(a) or 5(b), the characteristic of the actual yaw rate $\gamma$ of the vehicle 1 with respect to the target yaw rate $\gamma^*$ is approximated with the second order delay response shown in the equation (1) below, where $\tau$ is a time constant.

$$\gamma = \frac{1}{(1+\tau s)^2} \gamma^* \tag{1}$$

The target yaw rate $\gamma^*$, i.e., the yaw rate required for the vehicle 1 to arrive at the target position defined by the forward distance $l_s$ and the relative lateral displacement $y_s$ after the aforementioned prescribed time period $\Delta t$, can be expressed as shown in the equation (2) below if the slip angle of the vehicle body is ignored.

$$\gamma^* = \frac{2V}{l_s^2} \cdot y_s \tag{2}$$

Thus, in the control logic shown in FIG. 5(a), the target yaw rate $\gamma^*$ is obtained by averaging the changes in direction that the vehicle 1 will undergo by the time it arrives at the target position, e.g., as in the conventional method disclosed in the publication mentioned in the background of the invention above. In other words, the target yaw rate $\gamma^*$ is calculated such that the yaw rate that the vehicle 1 will exhibit is averaged and the response of the lateral displacement $y_c$ of the vehicle 1 with respect to the relative lateral displacement $y_s$ of the target position is as shown in the block diagram of FIG. 5(a). Integrating the yaw rate $\gamma$ to be exhibited by the vehicle 1 produces a yaw angle $\phi$ and integrating the yaw angle $\phi$ and multiplying the result by the traveling speed V produces the lateral displacement $y_c$ with respect to the lane in which the vehicle 1 is traveling. Also, multiplying the yaw angle $\phi$ by the forward distance $l_s$ produces the lateral movement distance. Thus, the sum of the lateral movement distance and the lateral displacement $y_c$ equals the relative lateral displacement $y_s$ between the current position and the target position of the vehicle 1. Assuming $y_s^*$ is a target value of the relative lateral displacement $y_s$ between the current position and the target position of the vehicle 1, a transfer function relating the vehicle lateral displacement $y_c$ to the target relative lateral displacement $y_s^*$ can be expressed as shown in the equation (3) (one example of a first transfer function) below.

$$\frac{y_c}{y_s^*} = \frac{\frac{2V^2}{l_s^2}}{\tau^2 s^4 + 2\tau s^3 + s^2 + \frac{2V}{l_s}s + \frac{2V^2}{l_s^2}} \tag{3}$$

Assuming the time constant $\tau$ is small and approximating the equation (3) above as a second-order vibration system, the natural frequency $\omega_n$ and the damping ratio $\zeta$ can be expressed as shown in the equations (4) and (5) below.

$$\omega_n = \frac{\sqrt{2}}{l_s} V \tag{4}$$

$$\zeta = \frac{\sqrt{2}}{2} \tag{5}$$

When the lane (road) on which the vehicle 1 is traveling has a substantially fixed curvature, it is preferable for the vehicle 1 to move smoothly along the curvature with a substantially fixed yaw rate. Since the target yaw rate $\gamma^*$ obtained with the control logic illustrated in FIG. 5(a) is calculated such that the yaw rate to the target position in front of the vehicle 1 is averaged, the target yaw rate $\gamma^*$ can be calculated to adapt the motion of the vehicle 1 to the road when the road is curved. Accordingly, wavering of the vehicle 1 on curved roads is reduced (because the target yaw rate $\gamma^*$ is calculated so that the motion of the vehicle 1 does not follow small variations in the lane).

When a target yaw rate $\gamma^*$ calculated such that the yaw rate to the target position is averaged is used, the damping ratio $\zeta$ expressed by the above equation (5) equals approximately 0.707. In general, a damping ratio $\zeta$ of 1 is said to be the critical damping response while damping ratios $\zeta$ smaller than 1 are considered to correspond to insufficiently damped responses and damping ratios $\zeta$ larger than 1 are considered to correspond to excessively damped responses. An insufficiently damped response means that the response is insufficiently damped and, in terms of control response, that the convergence is poor. Thus, if the control logic shown in FIG. 5(a) is used to calculate the target yaw rate $\gamma^*$ when the vehicle 1 is traveling on a straight road, there is the possibility that the vehicle 1 will experience wavering with respect to the lane.

Therefore, when the lane (road) is straight, the target yaw rate $\gamma^*$ with respect to the relative lateral displacement $y_s$ between the current position and the target position of the vehicle 1 is calculated by using a calculation function G as shown in FIG. 5(b). The target yaw rate $\gamma^*$ obtained with the control logic of FIG. 5(b) can be expressed as shown in the equation (6) below.

$$\gamma^* = G \cdot y_s \tag{6}$$

Thus, the transfer function of the lateral displacement $y_c$ of the vehicle with respect to the target relative lateral displacement $y_s^*$ can be expressed as shown in the equation (7) (one example of a second transfer function) below.

$$\frac{y_c}{y_s^*} = \frac{GV}{\tau^2 s^4 + 2\tau s^3 + s^2 + Gl_s s + GV} \quad (7)$$

Similarly to the case of the control logic of FIG. 5(a), if the time constant $\tau$ is assumed to be small and the equation (7) above is approximated as a second-order vibration system, the natural frequency $\omega_n$ and the damping ratio $\zeta$ can be expressed as shown in the equations (8) and (9) below.

$$\omega_n = \sqrt{GV} \quad (8)$$

$$\zeta = \frac{l_s}{2}\sqrt{\frac{G}{V}} \quad (9)$$

If, for example, the damping ratio $\zeta$ is 1, the target yaw rate $\gamma^*$ can be expressed with the equation (10) below because the target yaw rate $\gamma^*$ is determined by the calculation equation G.

$$\gamma^* = \frac{4V}{l_s^2} \cdot y_s \quad (10)$$

Since a damping ratio $\zeta$ of 1 corresponds to the critical damping response, the control response is such that the target value is reached with the least amount of delay and damping does not occur. When the vehicle 1 is traveling on a straight road, this approach results in the least wavering with respect to the target value and the path of travel can be followed with little delay. In short, when the road on which the vehicle 1 is traveling is straight, the target yaw rate $\gamma^*$ is set to such a value that the delay in the response of the vehicle motion does not exceed a target response time by using the control logic shown in FIG. 5(b). Conversely, if the target yaw rate $\gamma^*$ is controlled at the critical damping response as shown in FIG. 5(b) when the vehicle 1 is traveling on a curved road, the motion of the vehicle 1 will waver.

Thus, in the preferred embodiment of the present invention, the control unit 10 is configured to selectively chose between the calculation method for the target yaw rate $\gamma^*$ shown in FIG. 5(a) and the calculation method for the target yaw rate $\gamma^*$ shown in FIG. 5(b) depending on whether the road on which the vehicle 1 is traveling is determined to be curved or straight. More specifically, the target yaw rate $\gamma^*$ is calculated and set using the control logic of FIG. 5(a) when the detected conditions of the lane (road) indicate that the road is curved, and the target yaw rate $\gamma^*$ is calculated and set using the control logic of FIG. 5(b) when the detected conditions of the lane (road) indicate that the road is straight.

Although in the preceding explanation the calculation function G is set such that the damping ratio $\zeta$ is 1 when calculating the target yaw rate $\gamma^*$ for a straight road (FIG. 5(b)), the calculating function G can be set in any desired manner and, thus, the target yaw rate $\gamma^*$ can be calculated such that the damping ratio $\zeta$ is a value other than 1. For example, if the calculation function G is set such that the damping ratio $\zeta$ is larger than 1 (excessively damped response), the target value (target yaw rate $\gamma^*$) can be followed more gradually when the road is straight. Also, although the response of the vehicle 1 with respect to the target yaw rate $\gamma^*$ is approximated with a second-order delay, the calculation can be handled with a similar analytical approach even if a different characteristic relationship is used.

The target yaw rate $\gamma^*$ is thus calculated and set using the control logic of FIG. 5(a) when the road is curved and using the control logic of FIG. 5(b) when the road is straight. However, there is the possibility that the target value (i.e., the target yaw rate $\gamma^*$) will change in a step-like manner and impart an unnatural feeling to the driver and passengers of the vehicle if the target yaw rate calculation logic is merely switched when the lane (road) on which the vehicle 1 is traveling changes from curved to straight or from straight to curved.

Figure 6A:
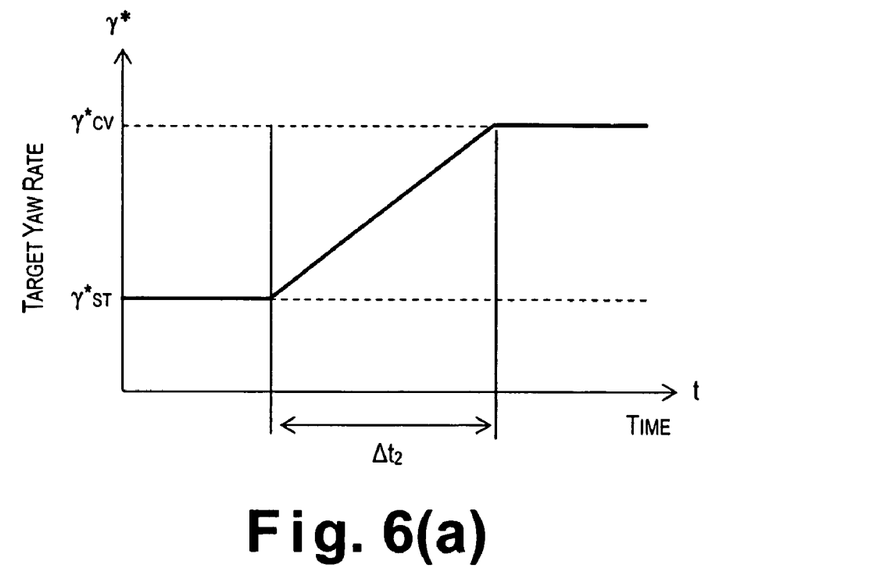
FIG. 6(a) is a plot illustrating the manner in which the target yaw rate is gradually changed from a target yaw rate calculated for a straight road to a target yaw rate calculated for a curved road within a prescribed period of time in the vehicle motion control device in accordance with the preferred embodiment of the present invention.

Therefore, with this preferred embodiment of the present invention, the unnatural feeling that can result from sudden changes in the target yaw rate $\gamma^*$ of the vehicle 1 can be prevented by gradually changing the target yaw rate $\gamma^*$ over a prescribed period of time. For example, when the road changes from a straight road to a curved road and the control unit 10 switches from using a target yaw rate $\gamma^*_{ST}$ for a straight road calculated according to the control logic of FIG. 5(b) to using a target yaw rate $\gamma^*_{CV}$ for a curved road calculated according to the control logic of FIG. 5(a), the target yaw rate value can be changed gradually over a prescribed period $\Delta t_2$ as illustrated, for example, in FIG. 6(a). Similarly, the control unit 10 can be configured to change the target yaw rate $\gamma^*$ gradually over the prescribed period $\Delta t_2$ from a target yaw rate $\gamma^*_{CV}$ for a curved road calculated according to the control logic of FIG. 5(a) to a target yaw rate $\gamma^*_{ST}$ for a straight road calculated according to the control logic of FIG. 5(b) when the lane (road) changes from a curved road to a straight road.

Figure 6B:
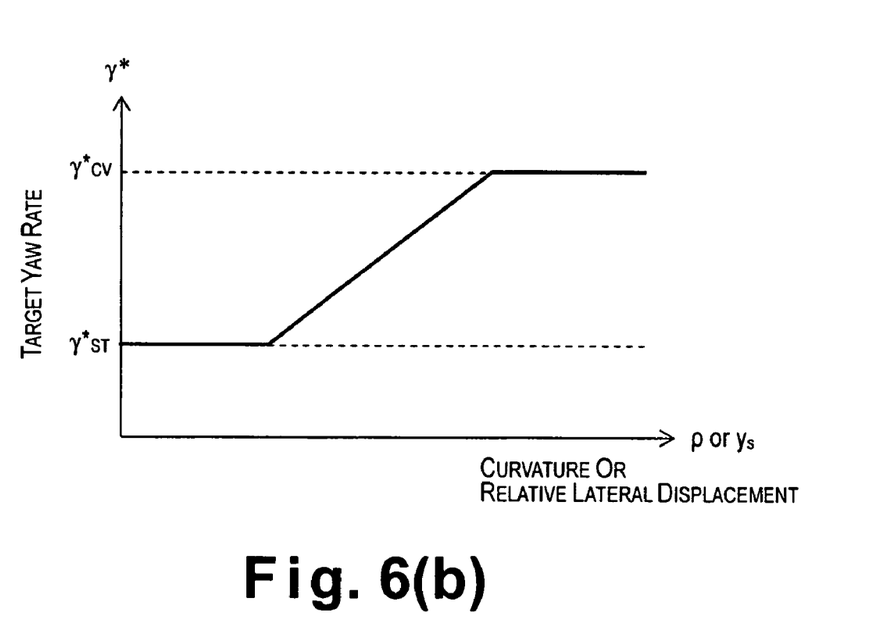

Alternatively, the unnatural feeling that can result from sudden changes in the target yaw rate $\gamma^*$ of the vehicle 1 can also be prevented by gradually changing the target yaw rate $\gamma^*$ in accordance with an entity or road curvature parameter that increases as the degree to which the road is curved increases instead of changing the target yaw rate $\gamma^*$ over the prescribed period of time $\Delta t_2$. For example, the curvature $\rho$ of the lane or the relative lateral displacement $y_s$ between the current position and the target position of the vehicle 1 can be used as the road curvature parameter. In such case, when the road changes from a straight road to a curved road and the control unit 10 switches from using a target yaw rate $\gamma^*_{ST}$ for a straight road calculated according to the control logic of FIG. 5(b) to using a target yaw rate $\gamma^*_{CV}$ for a curved road calculated according to the control logic of FIG. 5(a), the target yaw rate value can be changed gradually in accordance with the change in the curvature $\rho$ or the relative lateral displacement $y_S$ as illustrated, for example, in FIG. 6(b). Similarly, the control unit 10 can be configured such that when the lane (road) changes from a curved road to a straight road, the control unit 10 can be configured to change the target yaw rate $\gamma^*$ gradually in accordance with the change in the curvature $\rho$ or the relative lateral displacement $y_s$ from a target yaw rate $\gamma^*_{CV}$ for a curved road-calculated according to the control logic of FIG. 5(a) to a target yaw rate $\gamma^*_{ST}$ for a straight road calculated according to the control logic of FIG. 5(b).

Figure 7A:
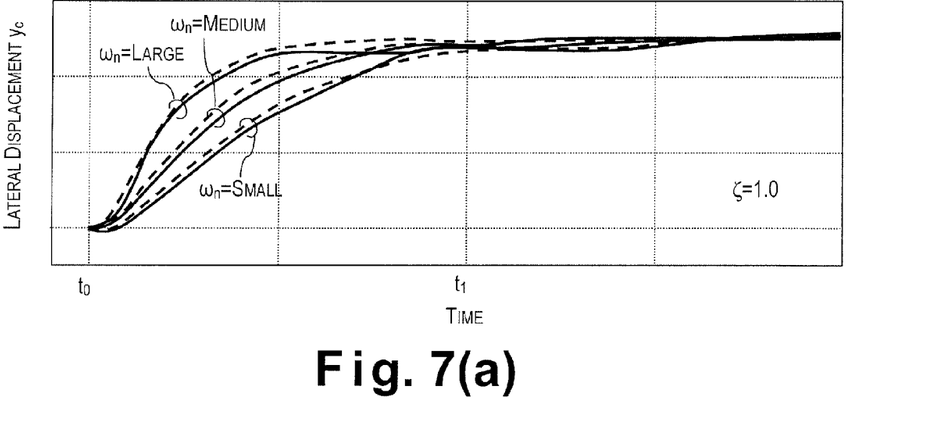
FIG. 7(a) is a diagram illustrating change in the lateral displacement with respect to time achieved with the lane tracking cruise control device when the target yaw rate is calculated in accordance with the control logic illustrated in FIG. 5(b) in accordance with the preferred embodiment of the present invention.
Figure 7B:
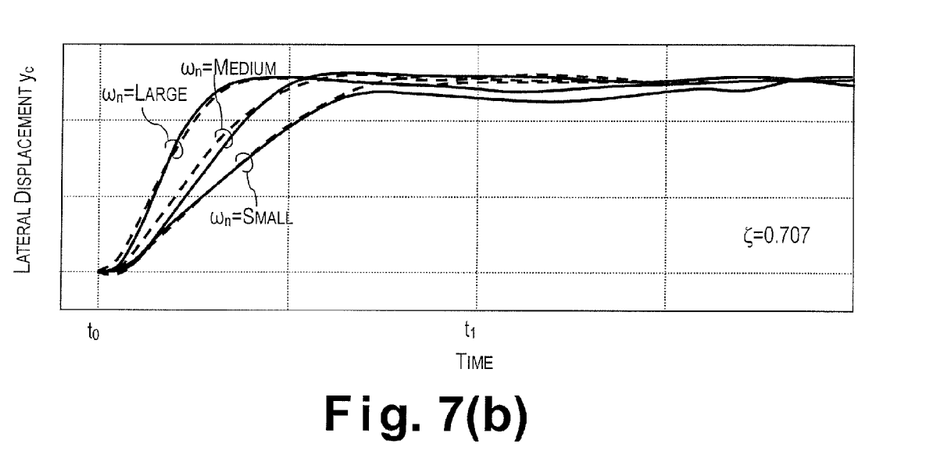
FIG. 7(b) is a diagram illustrating change in the lateral displacement with respect to time achieved with the lane tracking cruise control device when the target yaw rate is calculated in accordance with the control logic illustrated in FIG. 5(a) in accordance with the preferred embodiment of the present invention.

FIGS. 7(a) and 7(b) are graphs showing changes in the lateral displacement $y_c$ over time achieved with the lane tracking cruise control device coupled to the vehicle motion control device in accordance with this preferred embodiment of the present invention. FIG. 7(a) shows the results obtained when the target yaw rate $\gamma^*$ is calculated according to the control logic of FIG. 5(b) with the damping ratio $\zeta$ of 1 (one example of a second damping ratio), and FIG. 7(b) shows the results obtained when the target yaw rate γ* is calculated according to the control logic of FIG. 5(a) with a damping ratio ζ of approximately 0.707 (one example of a first damping ratio). In both graphs shown in FIGS. 7(a) and 7(b), it is assumed that the target yaw rate γ* takes effect at the time $t_0$ and the change in the lateral displacement $y_c$ is plotted with respect to time for different natural frequencies ωn. The dotted lines in FIGS. 7(a) and 7(b) indicate target values and the solid lines in FIGS. 7(a) and 7(b) indicate measured values. As is clear from FIGS. 7(a) and 7(b), the measured values of the lateral displacement $y_c$ corresponding to a time $t_1$ (a prescribed amount of time after $t_0$) exhibit better convergence in the case shown in FIG. 7(a) where the damping ratio ζ is 1.0 than in the case shown in FIG. 7(b) where the damping ratio ζ is approximately 0.707. Thus, by using the control logic of FIG. 5(b) to calculate the target yaw rate γ* when the vehicle 1 is traveling on a straight road, the vehicle 1 can be made to travel briskly without wavering.

Accordingly, with the vehicle motion control device in accordance with this preferred embodiment of the present invention, when the target yaw rate γ* required for the vehicle 1 to arrive at the target position set in front of the vehicle 1 is calculated. Then, the motion of the vehicle 1 is controlled based on changes in dynamic parameters indicative of vehicle traveling conditions to generate the calculated target yaw rate γ*. In the vehicle motion control device of the present invention, the road condition (i.e., whether the road is a straight road or a curved road) is detected, and the method of calculating the target yaw rate γ* is switched between the first and second calculating methods in accordance with the detected road condition. As a result, the target yaw rate γ* is adapted to the conditions of the road on which the vehicle 1 is traveling and, thus, the motion of the vehicle 1 can be adapted to the condition of the road at all times.

With this embodiment of the present invention, since the vehicle motion control device is configured to determine if the road on which the vehicle 1 is traveling is a straight road or a curved road and switch the method of calculating the target yaw rate γ* depending on whether the road is detected to be straight or curved, wavering of the vehicle 1 can be suppressed regardless of whether the road is straight or curved. In the case of curved roads, the vehicle 1 can be made to move smoothly along the curvature of the road by calculating the target yaw rate γ* in accordance with the control logic illustrated in FIG. 5(a). In the case of straight roads, the vehicle 1 can be made to move briskly with good convergence toward the target value (the target yaw rate γ*) by calculating the target yaw rate γ* in accordance with the control logic illustrated in FIG. 5(b).

With the vehicle motion control device of the preferred embodiment, the method of calculating the target yaw rate γ* is switched such that the actual yaw rate γ of the vehicle 1 during the vehicle 1 is traveling toward the target position set in front of the vehicle 1 is averaged when it is detected that the road on which the vehicle 1 is traveling is curved. Therefore, wavering can be suppressed while making the vehicle 1 move smoothly along the curvature of the road, i.e., while adapting the vehicle motion to the condition of the road (i.e., a curved road) on which the vehicle 1 is traveling.

On the other hand, with the vehicle motion control device, the target yaw rate γ* is calculated and set such that the delay in the response of the vehicle motion does not exceed a target response time when it is detected that the road on which the vehicle 1 is traveling is straight. Therefore, wavering can be suppressed while making the vehicle 1 move briskly and with good convergence on straight roads.

Moreover, the vehicle motion control device of this embodiment is configured to determine the road on which the vehicle 1 is traveling has changed from a straight road to a curved road when the difference between the lateral displacement $y_c$ of the vehicle 1 within the road and a target lateral displacement within the road based on the calculated target yaw rate γ* equals or exceeds a prescribed value. As a result, the determination of a change from a straight road to a curved road can be made in a reliable manner.

Furthermore, the vehicle motion control device of this embodiment can be configured to determine the road on which the vehicle 1 is traveling has changed from a straight road to a curved road when the relative lateral displacement $y_s$ between the current position and the target position of the vehicle is equal to or larger than a prescribed value. As a result, the determination of a change from a straight road to a curved road can be made in a reliable manner.

Also, the vehicle motion control device of this embodiment can be configured to determine the road on which the vehicle 1 is traveling has changed from a straight road to a curved road when the curvature ρ of the road in front of the vehicle 1 is equal to or larger than a prescribed value. As a result, the determination of a change from a straight road to a curved road can be made in a reliable manner.

The vehicle motion control device of this embodiment can be configured to determine the road on which the vehicle 1 is traveling has changed from a curved road to a straight road when the difference between the lateral displacement $y_c$ of the vehicle within the road and a target lateral displacement within the road based on the calculated target yaw rate γ* is equal to or less than a prescribed value. As a result, the determination of a change from a curved road to a straight road can be made in a reliable manner.

Moreover, the vehicle motion control device of this embodiment can be configured to determine the road on which the vehicle is traveling has changed from a curved road to a straight road when the relative lateral displacement $y_s$ between the current position and the target position is equal to or smaller than a prescribed value. As a result, the determination of a change from a curved road to a straight road can be made in a reliable manner.

Furthermore, the vehicle motion control device of this embodiment can be configured to determine the road on which the vehicle is traveling has changed from a curved road to a straight road when the curvature of the road in front of the vehicle is equal to or smaller than a prescribed value. As a result, the determination of a change from a curved road to a straight road can be made in a reliable manner.

With the vehicle motion control device of the present embodiment, the target yaw rate γ* is changed gradually over the prescribed period of time $\Delta t_2$ from the target yaw rate $γ*_{ST}$ calculated for a straight road to the target yaw rate $γ*_{CV}$ calculated for a curved road when the road on which the vehicle 1 is traveling is determined to have changed from a straight road to a curved road. Similarly, the target yaw rate γ* is changed gradually over the prescribed period of time $\Delta t_2$ from a target yaw rate $γ*_{CV}$ calculated for a curved road to a target yaw rate γ*ST calculated for a straight road when the road on which the vehicle 1 is traveling is determined to have changed from a curved road to a straight road. In either case, since the target yaw rate γ* is changed gradually over the prescribed period of time $\Delta t_2$, sudden changes in the target yaw rate γ* of the vehicle 1 are avoided and an unnatural feeling is prevented from being imparted to the passengers of the vehicle 1.

Moreover, the vehicle motion control device of the present invention can be configured to gradually change the target yaw rate $\gamma^*$ from a target yaw rate $\gamma^*_{ST}$ calculated for a straight road to a target yaw rate $\gamma^*_{CV}$ calculated for a curved road or from a target yaw rate $\gamma^*_{CV}$ calculated for a curved road to a target yaw rate $\gamma^*_{ST}$ calculated for a straight road such that the gradual change is made in accordance with either the relative lateral displacement $y_s$ between the current position and the target position of the vehicle 1 or the curvature $\rho$ of the road in front of the vehicle 1. As a result, since the target yaw rate $\gamma^*$ is changed gradually, the sudden changes in the target yaw rate $\gamma^*$ of the vehicle 1 are avoided and an unnatural feeling is prevented from being imparted to the passengers of the vehicle 1.

In the vehicle motion control device of the preferred embodiment, step S4 of the processing sequence shown in FIG. 3 and the control logics shown in FIGS. 5(a) and 5(b) constitute the target yaw rate calculating section of the present invention. The control logic shown in FIG. 5(a) constitutes a first calculating method, and the control logic shown in FIG. 5(b) constitutes a second calculating method. Step S5 of the processing sequence shown in FIG. 3 and the control logic shown in FIG. 2 constitute the vehicle motion control section. Steps S2 and S3 of the processing sequence shown in FIG. 3 and the camera controller 26 preferably constitute the road condition detecting section.

Although the preferred embodiment explained above illustrates a case in which the vehicle motion control device in accordance with the present invention is applied to the lane tracking cruise control device of the vehicle 1, the present invention is not limited to such an application. Rather, the vehicle motion control device of the present invention can be applied to any situation or system in which a target position is set in front of the vehicle 1, a target yaw rate $\gamma^*$ for reaching the target position is set, and the vehicle motion is controlled based on change in a dynamic parameter indicative of a vehicle traveling condition to achieve the target yaw rate $\gamma^*$. For example, the present invention can also be applied to a preceding vehicle tracking cruise control device that is configured to follow a preceding vehicle.

Although the embodiment described herein employs the microcomputer to execute the control processing of the control unit 10, it is also acceptable to use a combination of logic circuits instead.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining or computing or the like to carry out the operation or function.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle motion control device comprising:
   a road condition detecting section configured to detect one of a curved road and a straight road as a road condition;
   a target yaw rate calculating section configured to calculate a target yaw rate required for the vehicle to arrive at a target position that is set in front of the vehicle according to a first calculation using a first transfer function that achieves a first damping ratio of the first transfer function upon the road condition detecting section detecting a curved road, and calculates the target yaw rate according to a second calculation that is different from the first calculation using a second transfer function that achieves a second damping ratio of the second transfer function that is greater than the first damping ratio of the first transfer function upon the road condition detecting section detecting a straight road; and
   a vehicle motion control section configured to control a vehicle motion based on change in at least one dynamic parameter indicative of a vehicle traveling condition to generate the target yaw rate calculated in the target yaw rate calculating section.

2. The vehicle motion control device as recited in claim 1, wherein
   target yaw rate calculating section is configured to calculate the target yaw rate according to the first calculating method so that an actual yaw rate of the vehicle traveling to the target position is averaged upon the road condition detecting section detecting the curved road.

3. The vehicle motion control device as recited in claim 1, wherein
   the target yaw rate calculating section is configured to calculate the target yaw rate according to the second calculating method so that a response delay of the vehicle motion in response to the target yaw rate does not exceed a target response time upon the road condition detecting section detecting the straight road.

4. The vehicle motion control device as recited in claim 2, wherein
   the target yaw rate calculating section is configured to calculate the target yaw rate according to the second calculating method so that a response delay of the vehicle motion in response to the target yaw rate does not exceed a target response time upon the road condition detecting section detecting a straight road.

5. The vehicle motion control device as recited in claim 1, wherein
   the road condition detecting section is configured to determine whether the vehicle has switched between the straight road and the curved road based on a lateral displacement of the vehicle and a target lateral displacement obtained based on the target yaw rate calculated in the target yaw rate calculating section.

6. The vehicle motion control device as recited in claim 5, wherein
the road condition detecting section is configured to determine that the vehicle has changed from the straight road to the curved road which a difference between the lateral displacement of the vehicle and the target lateral displacement obtained based on the target yaw rate calculated in the target yaw rate calculating section equals or exceeds a prescribed value.

7. The vehicle motion control device as recited in claim 5, wherein
the road condition detecting section is configured to determine that the vehicle has changed from the curved road to the straight road when a difference between the lateral displacement of the vehicle and the target lateral displacement obtained based on the target yaw rate calculated by the target yaw rate calculating section is equal to or less than a prescribed value.

8. The vehicle motion control device as recited in claim 1, wherein
the road condition detecting section is configured to determine whether the vehicle has switched between the straight road and the curved road based on a relative lateral displacement between a current position of the vehicle and the target position of the vehicle.

9. The vehicle motion control device as recited in claim 8, wherein
the road condition detecting section is configured to determine that the vehicle has changed from the straight road to the curved road when the relative lateral displacement between the current position of the vehicle and the target position of the vehicle is equal to or larger than a prescribed displacement value.

10. The vehicle motion control device as recited in claim 8, wherein
the road condition detecting section is configured to determine that the vehicle has changed from the curved road to the straight road when the relative lateral displacement between the current position of the vehicle and the target position of the vehicle is equal to or less than a prescribed displacement value.

11. The vehicle motion control device as recited in claim 1, wherein
the road condition detecting section is configured to determine that the vehicle has switched between the straight road and the curved road based on a road curvature in front of the vehicle.

12. The vehicle motion control device as recited in claim 11, wherein
the road condition detecting section is configured to determine that the vehicle has changed from the straight road to the curved road when the road curvature in front of the vehicle is equal to or larger than a prescribed curvature.

13. The vehicle motion control device as recited in claim 11, wherein
the road condition detecting section is configured to determine that the vehicle has changed from the curved road to the straight road when the road curvature in front of the vehicle is equal to or less than a prescribed curvature.

14. The vehicle motion control device as recited in claim 1, wherein
the target yaw rate calculating section is configured to shift gradually between the target yaw rate calculated by the first calculating method and the target yaw rate calculated by the second calculating method within a prescribed time period when the road condition detecting section determines the vehicle has switched between the straight road and the curved road.

15. The vehicle motion control device as recited in claim 1, wherein
the target yaw rate calculating section is configured to shift gradually between the target yaw rate calculated by the first calculating method and the target yaw rate calculated by the second calculating method in accordance with a road curvature parameter that becomes larger as a road curvature in front of the vehicle becomes larger.

16. The vehicle motion control device as recited in claim 15, wherein
the road curvature parameter includes at least one of the road curvature in front of the vehicle and a relative lateral displacement between a current position of the vehicle and the target position of the vehicle.

17. A vehicle motion control device comprising:
road condition detecting means for detecting one of a curved road and a straight road as a road condition;
target yaw rate calculating means for calculating a target yaw rate required for the vehicle to arrive at a target position that is set in front of the vehicle according to a first calculation using a first transfer function that achieves a first damping ratio of the first transfer function upon the road condition detecting means detecting a curved road, and for calculating the target yaw rate according to a second calculation that is different from the first calculation using a second transfer function that achieves a second damping ratio of the second transfer function that is greater than the first damping ratio of the first transfer function upon the road condition detecting means detecting a straight road; and
vehicle motion control means for controlling a vehicle motion based on change in at least one dynamic parameter indicative of a vehicle traveling condition to generate the target yaw rate calculated in the target yaw rate calculating means.

18. A method of controlling vehicle motion comprising:
detecting one of a curved road and a straight road as a road condition;
calculating a target yaw rate required for the vehicle to arrive at a target position that is set in front of the vehicle according to a first calculating method using a first transfer function that achieves a first damping ratio of the first transfer function upon detecting a curved road, and calculating the target yaw rate according to a second calculating method that is different from the first calculating method using a second transfer function that achieves a second damping ratio of the second transfer function that is greater than the first damping ratio of the first transfer function upon detecting a straight road; and
controlling a vehicle motion based on change in at least one dynamic parameter indicative of a vehicle traveling condition to generate the target yaw rate.

* * * * *